US012800440B2

(12) United States Patent
Christensen

(10) Patent No.: US 12,800,440 B2
(45) Date of Patent: Nov. 17, 2026

(54) METHOD AND DEVICE FOR DETERMINING DAMAGE OF AN ENDLESS TRACK OF A TRACKED VEHICLE

(71) Applicant: BAE Systems Hägglunds Aktiebolag, Örnsköldsvik (SE)

(72) Inventor: Assar Christensen, Örnsköldsvik (SE)

(73) Assignee: BAE Systems Hägglunds Aktiebolag, Örnsköldsvik (SE)

(*) Notice: Subject to any disclaimer, the term of this patent is extended or adjusted under 35 U.S.C. 154(b) by 222 days.

(21) Appl. No.: 18/573,019

(22) PCT Filed: Jul. 5, 2022

(86) PCT No.: PCT/SE2022/050685
§ 371 (c)(1),
(2) Date: Dec. 21, 2023

(87) PCT Pub. No.: WO2023/282829
PCT Pub. Date: Jan. 12, 2023

(65) Prior Publication Data

US 2024/0288338 A1 Aug. 29, 2024

(30) Foreign Application Priority Data

Jul. 6, 2021 (SE) .................................... 2150889-0

(51) Int. Cl.
*G01M 17/03* (2006.01)
*B62D 55/32* (2006.01)
*B62D 55/24* (2006.01)

(52) U.S. Cl.
CPC ............. *G01M 17/03* (2013.01); *B62D 55/32* (2013.01); *B62D 55/244* (2013.01)

(58) Field of Classification Search
CPC ...... G01M 17/03; B62D 55/32; B62D 55/244
See application file for complete search history.

(56) References Cited

U.S. PATENT DOCUMENTS 6,532,810 B1 3/2003 Ahmed
10,358,178 B2 * 7/2019 Yoon .................... B62D 55/092
(Continued)

FOREIGN PATENT DOCUMENTS

CN 105627898 A 6/2016
CN 110877641 A 3/2020
(Continued)

OTHER PUBLICATIONS

International Search Report and Written Opinion for International Application No. PCT/SE2022/050685 mailed on Sep. 6, 2022, 16 pages.

(Continued)

*Primary Examiner* — Jill E Culler
(74) *Attorney, Agent, or Firm* — Morrison & Foerster LLP

(57) ABSTRACT

The disclosure relates to methods for determining damage of an endless track of a tracked vehicle that comprises at least one track assembly comprising said endless track disposed in its longitudinal extension around a set of wheels. Said track comprises a wire configuration arranged within said track configured to run in the longitudinal extension around said track. Said wire configuration comprises one or more individual wires arranged to run within said endless track so that a set of wire portions are running in said longitudinal extension. The method comprises: receiving, from at least one sensor device, via measuring connectors, measurement information associated with electrical properties of wire portions of said wire configuration; based on the information received from said at least one sensor device, determining electrical properties of said wire portions; and, based on the determined electrical properties, determining whether there is a damage to the endless track.

17 Claims, 4 Drawing Sheets

(56) References Cited

U.S. PATENT DOCUMENTS

| | | | | |
|---|---|---|---|---|
| 2007/0131035 | A1 | 6/2007 | Krutz et al. | |
| 2007/0256485 | A1 | 11/2007 | Rensel et al. | |
| 2009/0178902 | A1 | 7/2009 | Lynn et al. | |
| 2011/0123237 | A1 | 5/2011 | Kudo et al. | |
| 2012/0043980 | A1* | 2/2012 | Davies | G01B 7/18 324/693 |
| 2014/0326582 | A1 | 11/2014 | Sakaguchi | |
| 2016/0178483 | A1 | 6/2016 | Sidles | |
| 2020/0070906 | A1 | 3/2020 | Laperle et al. | |
| 2024/0190523 | A1* | 6/2024 | Rowa | G01M 17/03 |

FOREIGN PATENT DOCUMENTS

| | | | |
|---|---|---|---|
| EP | 1873088 | A1 | 1/2008 |
| JP | 2006-315848 | A | 11/2006 |
| WO | 2007/109896 | A1 | 10/2007 |
| WO | 2016/099796 | A1 | 6/2016 |
| WO | 2017/049393 | A1 | 3/2017 |
| WO | 2020/208179 | A1 | 10/2020 |
| WO | 2021/105941 | A1 | 6/2021 |

OTHER PUBLICATIONS

Office Action dated Mar. 11, 2022, directed to SE Application No. 2150889-0; 8 pages.
Office Action dated Sep. 7, 2022, directed to SE Application No. 2150889-0; 6 pages.
Search Report dated Sep. 16, 2025, directed to SG Application No. 11202309023W; 2 pages.
Extended European Search Report dated Mar. 25, 2025, directed to EP Application No. 22838127.3; 7 pages.
Search Report dated Jul. 10, 2026, directed to CN Application No. 202280047255.6; 6 pages.

* cited by examiner

METHOD AND DEVICE FOR DETERMINING DAMAGE OF AN ENDLESS TRACK OF A TRACKED VEHICLE

CROSS-REFERENCE TO RELATED APPLICATIONS

This application is a U.S. national stage application under 35 U.S.C. 371 of International Application No. PCT/SE2022/050685, filed Jul. 5, 2022, which claims the priority of SE Application No. 2150889-0, filed Jul. 6, 2021. The entire contents of each priority application is incorporated herein by reference.

FIELD OF THE DISCLOSURE

The present invention relates to a method for determining damage of an endless track of a tracked vehicle. The present invention also relates to an arrangement for determining potential damage of an endless track of a tracked vehicle. The present invention also relates to a tracked vehicle. The present invention in addition relates to a computer program and a computer program product.

BACKGROUND OF THE DISCLOSURE

Tracked vehicles may be equipped with opposite track assemblies. Each track assembly comprises an endless track arranged to run in a longitudinal extension over a set of wheels comprising a drive wheel member, a tension wheel member and a set of road wheels there between. Said endless track is configured to be rotated by means of said drive wheel member during drive of the tracked vehicle.

Such endless tracks may be endless tracks of a rubber material and comprising a wire configuration arranged within said endless track and configured to run in the longitudinal extension of said endless track around said endless track.

Such tracked vehicles, e.g. combat vehicles, are intended to be driven in rough terrain, which may increase the risk of damage of an endless track of the tracked vehicle. Broken wires may result in said endless track being torn apart. Determination of potential damage to an endless track may be performed by visual control, looking at e.g. degree of visual damage. This is however not a fully reliable method due to the fact that also non-visual damage may result in severe damage on the endless track with the risk of said endless track being torn apart.

There is thus a need for improving determining damage of an endless track of a tracked vehicle.

OBJECTS OF THE INVENTION

An object of the present invention is to provide a method for determining damage of an endless track of a tracked vehicle.

Another object of the present invention is to provide an arrangement for determining damage of an endless track of a tracked vehicle.

Another object of the present invention is to provide a tracked vehicle comprising such an arrangement.

Yet another object of the present invention is to provide a computer program for performing said method and a computer program product for storing the computer program.

SUMMARY OF THE DISCLOSURE

These and other objects, apparent from the following description, are achieved by a method, an arrangement, a tracked vehicle, a computer program and a computer program product as set out in the appended independent claims. Preferred embodiments of the method and the arrangement are defined in appended dependent claims.

According to an aspect of the present disclosure there is provided a method for determining damage of an endless track of a tracked vehicle. Said tracked vehicle comprises at least one track assembly comprising said endless track disposed in its longitudinal extension around a set of wheels, wherein said endless track comprises a wire configuration arranged within said endless track and configured to run in the longitudinal extension of said endless track around said endless track. Said wire configuration comprises one or more individual wires arranged to run within said endless track so that a set of wire portions are running in said longitudinal extension. A set of measuring connectors are connected to wire portions of said set of wire portions so as to facilitate measuring electrical properties of the thus connected wire portions. Said set of measuring connectors are accessible by means of one or more sensor devices in connection to at least one side of said endless track. The method comprises the step of receiving, from at least one sensor device, via measuring connectors, measurement information associated with electrical properties of wire portions of said wire configuration. The method further comprises the step of, based on the information received from said at least one sensor device, determining electrical properties of said wire portions. The method further comprises, determining, based on the determined electrical properties, whether or not there is a damage to the endless track. Said endless track has opposite sides configured to face in a direction essentially parallel to the axial direction of said set of wheels. Said set of measuring connectors are accessible by means of one or more sensor devices in connection to at least one side of said sides of endless track configured to face in a direction essentially parallel to the axial direction of said set of wheels.

Hereby a safe and reliable method of determining damage of an endless track of a tracked vehicle is facilitated. Hereby broken, i.e. torn apart, wires/wire portions within an endless track may be detected, even without any obvious visual damage on said endless track. Hereby severe damage to the endless track so that the endless track is torn apart may be avoided, since degree of damage, including non-visual damage, of said endless track, i.e. wire portions of said endless track and degree of damage to wire portions, may be discovered prior to the risk of severe damage which may result in the endless track being torn apart.

According to an aspect of the present disclosure, said one or more individual wires are arranged to run within said endless track so that said set of wire portions running in said longitudinal extension are arranged adjacent to each other within said endless track. According to an aspect of the present disclosure, said set of wire portions running in said longitudinal extension are configured to run and be arranged adjacent to each other within said endless track so as to provide and/or contribute to the stiffness of said endless track.

According to an aspect of the present disclosure, said set of measuring connectors are externally accessible by means of one or more sensor devices in connection to at least one side of said endless track.

According to an aspect of the present disclosure, said set of wheels of said track assembly comprises a drive wheel member, a tension wheel member, and a set of road wheels, with said endless track disposed in its longitudinal extension around said wheels. According to an aspect of the present disclosure, said endless track is configured to be rotated by means of said drive wheel member during drive of the tracked vehicle, According to an aspect of the present disclosure, said wire configuration provides and/or contributes to the stiffness of said endless track, wherein a broken wire/wire portion of said wire configuration may change the stiffness of said endless track. Said wire configuration may according to an aspect of the present disclosure be a wire configured to run within said endless track a number of laps within and around said endless track such that a number of wire portions are running within said endless track adjacent to each other so as to provide an increased stiffness of said endless track. Alternatively said wire configuration, according to an aspect of the present disclosure may comprise two or more individual wires arranged to run one or more laps within said endless track and be arranged adjacent to each other. According to an aspect of the present disclosure, said wire/wire portions of said wire configuration may comprise a set of strands twisted or otherwise arranged together to form said wire/wire portion.

Said at least one sensor device may be any suitable sensor device for facilitating measuring electrical properties of wire portions of said wire configuration when providing connection to measuring connectors. According to an aspect of the present disclosures, said at least one sensor device may comprise one or more potentiometers. According to an aspect of the present disclosures, said at least one sensor device may comprise one or more cable finders. Said at least one sensor device may comprise any suitable sensor device/arrangement for sensor device for generating power so as to facilitate determining electrical properties when providing connection to measuring connectors.

According to an aspect of the present disclosure, said measuring connectors are configured to be connected to wire portions of said set of wire portions via conducting cables so as to facilitate measuring electrical properties of thus connected wire portions by providing a conductive circuit. Thus, according to an aspect of the present disclosure, anomalies associated with said electrical circuit, i.e. anomalies associated with connections of said electrical circuit, determined by means of said at least on sensor device, may be determined to relate to damage of wire portion of said electrical circuit. According to an aspect of the present disclosure, electrical properties of wire/wire portions of said wire configuration comprising a set of strands twisted or otherwise arranged together may change/vary due to number of strands of said set of strands being broken/torn apart.

According to an aspect of the present disclosure, said measuring connectors comprises conducting cables which are configured to be connected to wire portions of said set of wire portions so as to facilitate measuring electrical properties of thus connected wire portions by providing a conductive circuit.

According to an aspect of the present disclosure, said measuring connectors are configured to be permanently connected in connection to at least one of the sides of said endless track, wherein different measuring connectors of said measuring connectors are configured to be connected to different connection points of wire portions of said set of wire portions via conducting cables/wires.

According to an aspect of said method, said measuring connectors are configured to be an integrated part of said endless track, said measuring connecters being assembled in connection to at least one of the sides of said endless track. Hereby easy and efficient determination of damages of said endless track is facilitated, in that the accessibility for said one or more sensor devices is facilitated so that potential damage of said endless track may be easily, e.g. manually, determined. According to an aspect of the present disclosure, each measuring connector of said set of measuring connectors comprises or is operably connected to a conducting cable configured to be connected to a connection point of a wire portion of said set of wire portions of said wire configuration. Said conducting cables are configured to be an integrated part of said endless track.

According to an aspect of said method, the step of determining whether or not there is a damage to the endless track comprises the steps of: comparing the determined electrical properties of said wire portions with predetermined electrical properties of wire portions of said wire configuration; and, determining a damage to the endless track if the difference between said determined electrical properties of one or more wire portions and said predetermined electrical properties of wire portions of said wire configuration exceeds a predetermined threshold. By means of such a comparison, a safe and reliable method of determining damage of an endless track of a tracked vehicle is facilitated. Hereby broken, i.e. torn apart, wires/wire portions within an endless track may be efficiently detected.

According to an aspect of said method, the step of determining whether or not there is a damage to the endless track comprises determining whether one or more wire portions are torn apart based on said determined electrical properties. By thus determining whether one or more wire portions are broken/torn apart, a safe and reliable method of determining damage of an endless track of a tracked vehicle is facilitated.

According to an aspect said method further comprises determining, if it is determined that there is damage to the endless track, the degree of damage based on number of wire portions having electrical properties exceeding a predetermined threshold. According to an aspect said method further comprises determining, if it is determined that there is damage to the endless track, the degree of damage based on number of wire portions having electrical properties exceeding a predetermined threshold and to what extent they exceed said predetermined threshold.

According to an aspect said method further comprises determining, if it is determined that there is damage to the endless track, the degree of damage based on number of wire portions having electrical properties exceeding said predetermined threshold. Hereby a safe and reliable method of determining not only damage but also degree of damage of an endless track of a tracked vehicle is facilitated. Hereby it may be easily and efficiently determined whether the endless track of a track assembly of a tracked vehicle is still operable or needs to be replaced/repaired.

According to an aspect of said method, the step of receiving, from at least one sensor device, measurement information associated with electrical properties of wire portions of said wire configuration, comprises receiving measurement information from measurement between a first connection point and a second connection point of a wire portion. According to an aspect of the present disclosure, such a sensor device is configured to be connectable to a first measuring connector connected to a first connection point of a wire portion and a second measuring connector connected to a second connection point of said wire portion so as to provide a conductive circuit comprising said wire portion of said wire configuration and said first and second measuring connector.

According to an aspect of said method, the step of receiving, from at least one sensor device, measurement information associated with electrical properties of wire portions of said wire configuration, comprises receiving measurement information associated with one or more of: electrical current: electrical resistance, electrical voltage, magnetic properties.

According to another aspect of the present disclosure there is provided an arrangement for determining damage of an endless track of a tracked vehicle. Said tracked vehicle comprises at least one track assembly comprising said endless track disposed in its longitudinal extension around a set of wheels, wherein said endless track comprises a wire configuration arranged within said endless track and configured to run in the longitudinal extension of said endless track around said endless track. Said wire configuration comprises one or more individual wires arranged to run within said endless track so that a set of wire portions are running in said longitudinal extension. Said arrangement comprises a set of measuring connectors connected to wire portions of said set of wire portions so as to facilitate measuring electrical properties of the thus connected wire portions. Said set of measuring connectors are configured to be accessible by means of one or more sensor devices in connection to at least one side of said endless track, so as to facilitate determining damage to said endless track based on determined electrical properties of wire portions. Said endless track has opposite sides configured to face in a direction essentially parallel to the axial direction of said set of wheels. Said set of measuring connectors are accessible by means of one or more sensor devices in connection to at least one side of said sides of endless track configured to face in a direction essentially parallel to the axial direction of said set of wheels. According to an aspect of the present disclosure, said one or more individual wires are arranged to run within said endless track so that said set of wire portions running in said longitudinal extension are arranged adjacent to each other within said endless track. According to an aspect of the present disclosure, said set of measuring connectors are configured to be externally accessible by means of one or more sensor devices in connection to at least one side of said endless track.

According to an aspect said arrangement comprises at least one sensor device of said one or more sensor devices, and a control unit. Said control unit is configured to receive, from said at least one sensor device, via measuring connectors, measurement information associated with electrical properties of wire portions of said wire configuration. Said control unit is further configured to determine, based on the information received from said at least one sensor device, electrical properties of said wire portions. Said control unit is further configured to determine, based on the determined electrical properties, whether or not there is a potential damage to the endless track.

According to an aspect said arrangement, said control unit, when determining whether or not there is a damage to the endless track, is configured to: compare the determined electrical properties of said wire portions with predetermined electrical properties of wire portions of said wire configuration; and, determine a potential damage to the endless track if the difference between said determined electrical properties of one or more wire portions and said predetermined electrical properties of wire portions of said wire configuration exceeds a predetermined threshold.

According to an aspect said arrangement, said control unit, when determining whether or not there is a potential damage to the endless track, further is configured to determine whether one or more wire portions are torn apart based on said determined electrical properties.

According to an aspect of said arrangement, the control unit is further configured to determine, if it is determined that there is damage to the endless track, the degree of potential damage based on number of wire portions having electrical properties exceeding said predetermined threshold.

According to an aspect said arrangement comprises at least one sensor device of said one or more sensor devices, wherein a sensor device of said at least one sensor device, is configured to be connected to a first measuring connector connected to a first connection point of a wire portion and a second measuring connector connected to a second connection point of a wire portion, so as to receive measurement information associated with electrical properties from measurement between said first connection point and a second connection point of said wire portion.

According to an aspect of said arrangement, said determined electrical properties of wire portions of said wire configuration via measuring connectors, comprises one or more of: electrical current; electrical resistance, electrical voltage, magnetic properties.

According to an aspect of said arrangement, said measuring connectors are configured to be an integrated part of said endless track, said measuring connecters being assembled in connection to at least one of the sides of said endless track.

The arrangement for determining damage of an endless track of a tracked vehicle according to the present disclosure has the advantages according to the corresponding method as set out herein.

According to yet another aspect of the present disclosure there is provided a tracked vehicle comprising an arrangement as set out herein.

According to yet another aspect of the present disclosure there is provided a computer program comprising computer-readable instructions which, when executed by at least one processor of a control unit of an arrangement as set out herein for determining potential damage of an endless track of a tracked vehicle, causes the at least one processor to perform any of, or any combination of, the method steps of the above described method.

According to yet another aspect of the present disclosure there is provided a computer program product comprising at least one computer-readable medium, such as a non-volatile memory, storing the above-mentioned computer program.

BRIEF DESCRIPTION OF THE FIGURES

For a better understanding of the present disclosure reference is made to the following detailed description when read in conjunction with the accompanying drawings, wherein like reference characters refer to like parts throughout the several views, and in which.

DETAILED DESCRIPTION OF THE DISCLOSURE

Hereinafter the term "link" refers to a communication link which may be a physical connector, such as an optoelectronic communication wire, or a non-physical connector such as a wireless connection, for example a radio or microwave link.

Herein the term "wire portion" may refer to any portion of a wire of a wire configuration configured to run within an endless track of a track assembly of a tracked vehicle in the longitudinal direction of said track a number of laps within and around said endless track. Herein the term "wire portion" may refer to a portion of a wire running within said endless track in the longitudinal direction of said track along a portion of said endless track, or one or more laps within and around said endless track. Herein the term "wire portion" may refer to a portion of a wire running in the longitudinal direction of said track a certain stretch within said endless track between a first connection point for a first connection point of said wire, to which a first measuring connector is connected, and a second connection point of said wire, to which a second measuring connector is connected, wherein a sensor device is configured to be connectable to said first measuring connector and second measuring connector for providing a conductive circuit comprising said wire portion so as to facilitate determining electrical properties of said wire portion between said first and second connection points.

Figure 1:
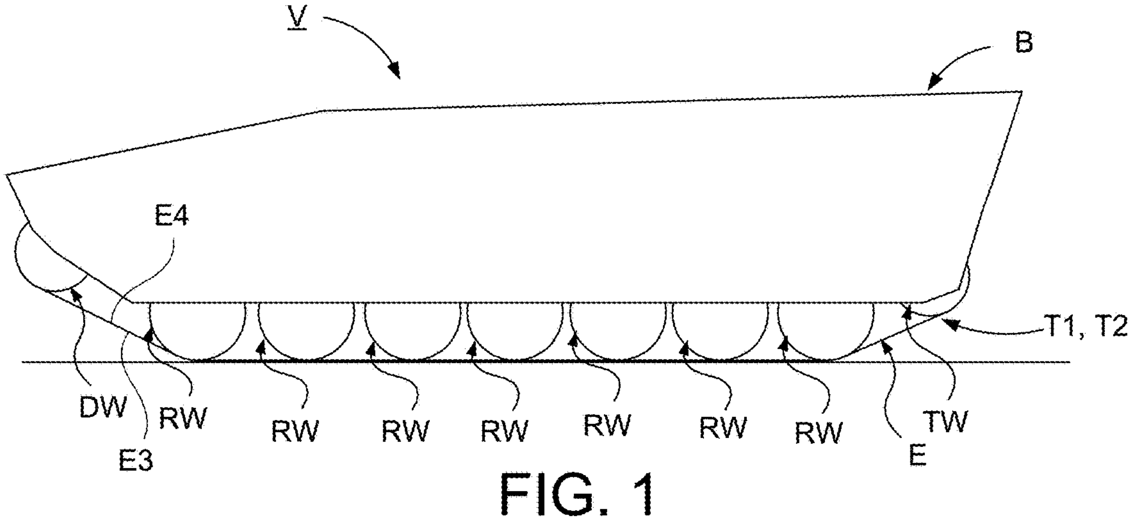
FIG. 1 schematically illustrates a side view of a tracked vehicle according to an embodiment of the present disclosure.
Figure 2:
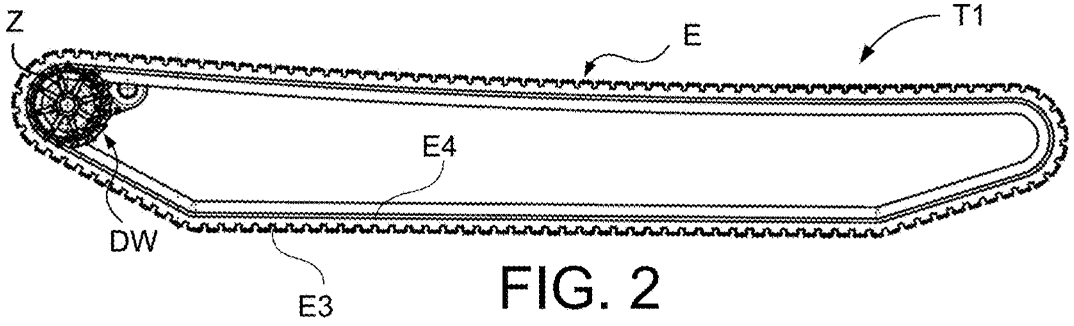
FIG. 2 schematically illustrates a side view of a track assembly of a tracked vehicle according to an embodiment of the present disclosure.
Figure 3:
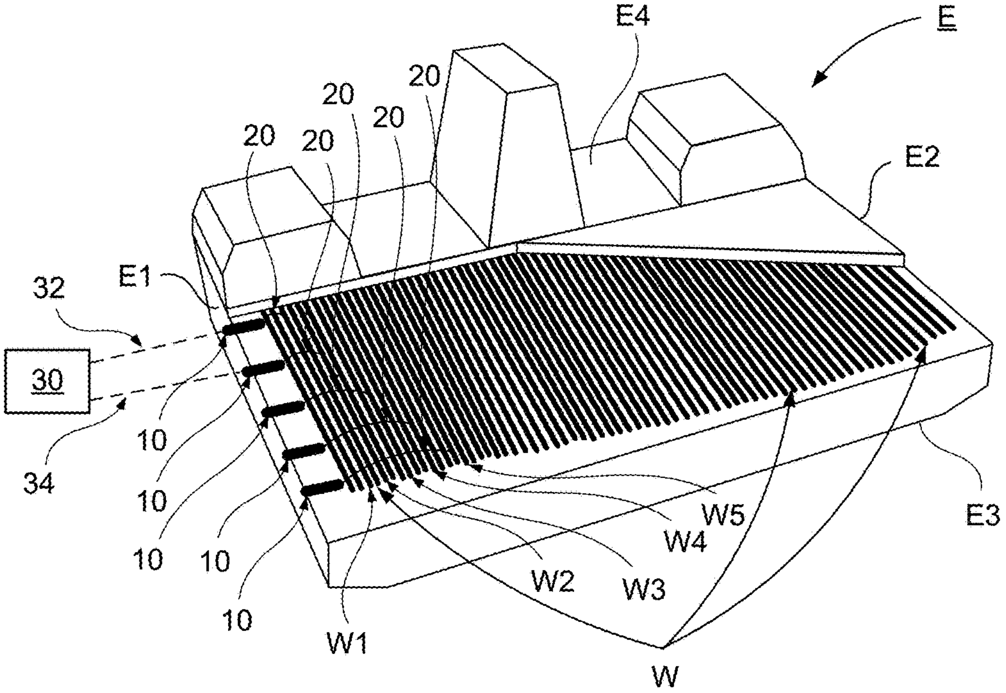
FIG. 3 schematically illustrates a perspective view of a portion of an endless track of a track assembly according to an embodiment of the present disclosure.
Figure 4:
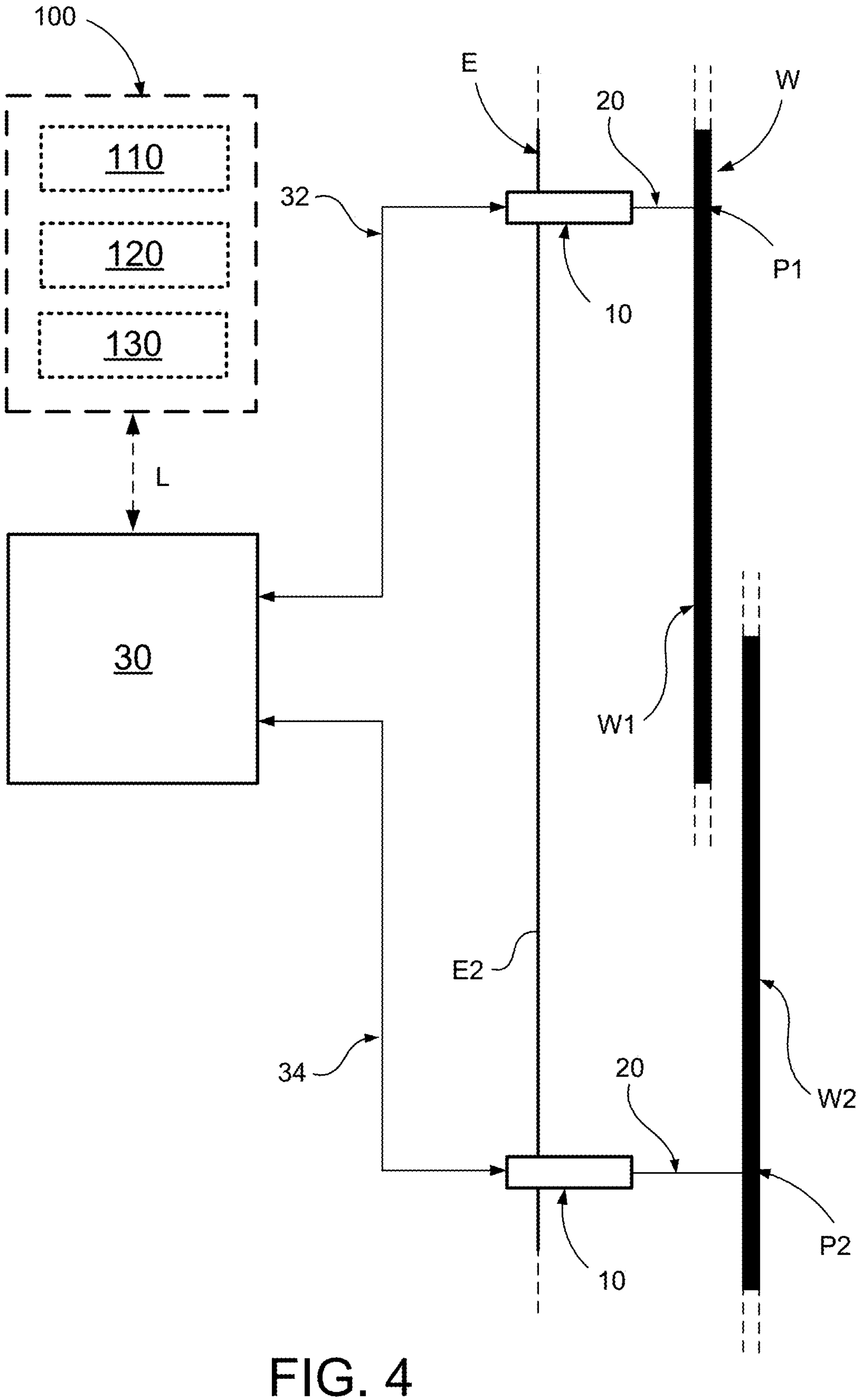
FIG. 4 schematically illustrates a plan view of a portion of an endless track with a sensor device connected to measuring connectors according to an embodiment of the present disclosure.

FIG. 1 schematically illustrates a side view of a tracked vehicle V according to an embodiment of the present disclosure. FIG. 2 schematically illustrates a perspective view of a track assembly T1 of a tracked vehicle, e.g. a tracked vehicle according to FIG. 1, according to an embodiment of the present disclosure. FIG. 3 schematically illustrates a perspective view of a portion of the track assembly T1 in FIG. 2 according to an embodiment of the present disclosure. FIG. 4 schematically illustrates a plan view of a portion of an endless track E with a sensor device 30 connected to measuring connectors according to an embodiment of the present disclosure.

The tracked vehicle V is according to the disclosure in FIG. 1 a military vehicle. The tracked vehicle V is according to the disclosure in FIG. 1 a combat vehicle.

The tracked vehicle V comprises a vehicle body B, which according to an aspect of the present disclosure comprises the chassis of the vehicle V and bodywork.

The tracked vehicle V comprises a right track assembly T1 and a left track assembly T2 for driving the vehicle V, the left track assembly being shown in FIG. 1. Each track assembly comprises a drive wheel member DW, a tension wheel member TW, a set of road wheels RW and an endless track E arranged to run over said wheels. Here the drive wheel member DW is arranged in the front, the tension wheel member TW is arranged in the back and the road wheels RW are arranged between the drive wheel member DW and the tension wheel member TW. The tracked vehicle according to the present disclosure may however have track assemblies with any suitable arrangement of drive wheel member, tension wheel member and road wheels. According to an aspect of the present disclosure the tension wheel member may be arranged in the front, the drive wheel member arranged in the back and the road wheels arranged there between.

The endless track E of the respective track assembly is arranged to be driven and hence rotated by means of said drive wheel member DW. The tracked vehicle V comprises a drive means, not shown, for driving said drive wheel members DW. The drive means may be any suitable drive means such as an internal combustion engine and/or an electric machine.

The endless track E of the respective track assembly T1 of the tracked vehicle V has an outer side E1 facing out from a vehicle in the transversal direction of the vehicle and an inner side E2 facing towards the vehicle in the transversal direction of the vehicle to which the track assembly is mounted, see FIG. 3.

The outer side E1 facing out from a vehicle in the transversal direction of the vehicle V is thus a transversal outer side E1. The inner side E2 facing towards the vehicle in the transversal direction of the vehicle V is thus a transversal inner side E2. The outer side E1 and inner side E2 of said endless track E are configured to face in a direction essentially parallel to the axial direction of wheels surrounded by said endless track and being comprised in the track assembly comprising said endless track E. See e.g. FIG. 2 illustrating the track assembly T1 with the drive wheel DW, the drive wheel DW being configured to rotate about an axis Z, said sides E1, E2 facing in a direction essentially parallel to said axis Z. The outer side E1 of the endless track E may hereby be denoted the axial outer side E1 and inner side E2 of the endless track the axial inner side E2.

The endless track E of the respective track assembly T1 of the tracked vehicle V has an outer side E3 facing away from the drive wheel member DW when the track is engaging with the drive wheel member DW and an inner side E4 facing towards the drive wheel member DW when the track is engaging with the drive wheel member DW, see FIGS. 1 and 2. The outer side E3 is a ground engaging outer side E3, a portion of said ground engaging outer side E3 being configured to engage with the ground, the portion changing during drive and thus rotation of the track E. The inner side E4 is a drive wheel engaging inner side E4, a portion of said drive wheel engaging inner side E4 being configured to engage with the drive wheel member DW, the portion changing during drive and thus rotation of the track E. The ground engaging outer side E3 and the opposite drive wheel engaging inner side E4 of the endless track E are thus facing in a direction orthogonal to the direction of the transversal outer side E1 and transversal inner side E2 of the endless track E. The endless track E is configured to surround wheels of the vehicle, see e.g. FIG. 1, including said drive wheel member DW so that said inner side E4 is facing said wheels.

The endless track E of the respective track assembly may have any suitable configuration and be of any suitable material. The endless track E of the respective track assembly may, according to an aspect of the present disclosure, be a rubber track.

According to an aspect of the present disclosure, said endless track E comprises a wire configuration W arranged within said endless track E. Said wire configuration W is configured to run in the longitudinal extension of said endless track E around said endless track E. See FIG. 3. According to an aspect of the present disclosure, said wire configuration W comprises one or more wires configured to run in the longitudinal extension of said endless track E around said endless track E. According to an aspect of the present disclosure, said wire configuration W comprises one or more wires configured to run within said endless track E in the longitudinal extension of said endless track E around said endless track E. According to an aspect of the present disclosure, said wire configuration W comprises one or more wires configured to run in the longitudinal extension of said endless track E around said endless track E multiple laps. According to an aspect of the present disclosure, said wire configuration W comprising one or more wires configured to run in the longitudinal extension of said endless track E multiple laps around said endless track E are configured to be distributed along the width of said endless track E. See FIG. 3. Said wire configuration W is arranged within said endless track E between said ground engaging outer side E3 and the opposite drive wheel engaging inner side E4 of the endless track E.

According to an aspect of the present disclosure, said wire/wire portions of said wire configuration may comprise a set of strands twisted or otherwise arranged together to form said wire/wire portion.

According to an aspect of the present disclosure, said wire configuration W may comprise one or more steel wires.

According to an aspect of the present disclosure, said wire configuration W is configured to provide connection for said endless track E. According to an aspect of the present disclosure, said wire configuration W is configured to provide longitudinal attachment for said endless track E. According to an aspect of the present disclosure, said wire configuration W is configured to longitudinally hold said endless track E together.

According to an aspect of the present disclosure, said at least one wire of said wire configuration W may be configured to run in the longitudinal extension of said endless track E around said endless track E laps in the range of 20-100, i.e. running around said endless track in the longitudinal extension 20 to 100 times.

According to an aspect of the present disclosure, an arrangement for determining damage of an endless track E of a tracked vehicle V is provided.

Such an arrangement is schematically illustrated in FIGS. 3 and 4. Such an arrangement, schematically illustrated in FIGS. 3 and 4, is intended for a tracked vehicle V, e.g. as illustrated in FIG. 1, comprising at least one track assembly T1, T2 comprising said endless track E disposed in its longitudinal extension around a set of wheels, wherein said endless track E comprises a wire configuration W arranged within said endless track E and configured to run in the longitudinal extension of said endless track E around said endless track E. Said wire configuration W may comprise one or more individual wires arranged to run within said endless track E. As illustrated in FIG. 3, said wire configuration comprises a set of wire portions running in said longitudinal extension, arranged adjacent to each other within said endless track E. In FIG. 3 parts of said wire portions are illustrated. In FIG. 3, five wire portions W1, W2, W3, W4, W5 are given a reference number for illustrative purposes. In FIG. 3, said five wire portions W1, W2, W3, W4, W5 given reference numbers comprises, of said set of adjacent wire portions of said wire configuration W, counted from the outer side E1 of said endless track E, the third wire portion W1, the sixth wire portion W2, the ninth wire portion W3, the twelfth wire portion W4 and the fifteenth wire portion W5. According to an aspect of the present disclosure, at least wire portions of said set of wire portions comprising the outer most wire portion on the outer side E1 and adjacent wire portions comprising said wire portions W1, W2, W3, W4, W5 are comprised of a single wire configured to run within said endless track a number of laps.

Said arrangement comprises a set of measuring connectors 10. Said measuring connectors 10 are configured to be externally accessible by means of one or more sensor devices 30 in connection to at least one side E1, E2 of said endless track E.

According to an aspect of the present disclosure, said measuring connectors 10 are configured to be permanently connected in connection to at least one of the sides E1, E2 of said endless track E. According to an aspect of the present disclosure, said measuring connectors 10 are configured to be an integrated part of said endless track E, said measuring connecters 10 being assembled in connection to at least one of the sides E1, E2 of said endless track E.

According to an aspect of the present disclosure, said measuring connectors 10 are configured to be arranged at least partly within said endless track E between said ground engaging outer side E3 and the opposite drive wheel engaging inner side E4 of the endless track E.

Said measuring connectors 10 may be made of any suitable conductive material. According to an aspect of the present disclosure, said measuring connectors 10 are configured to be casted within said endless track E in connection to at least one of the sides E1, E2.

Said arrangement may comprise any suitable number of measuring connectors 10. Said number of measuring connectors 10 may depend on the number of wire portions running in the longitudinal direction of said endless track and being arranged adjacent to each other transversely within the endless track E. Said number of measuring connectors 10 may depend on the desired accuracy for determining damage to said wire configuration W, i.e. wire portions of said wire configuration W. For the portion of the endless track E illustrated in FIG. 3, five measuring connectors 10 arranged in connection to the outer side E1 of said endless track E are schematically illustrated.

As mentioned, said set of measuring connectors 10 are configured to be connected to wire portions of said set of wire portions so as to facilitate measuring electrical properties of the thus connected wire portions. According to an aspect of the present disclosure, said measuring connectors 10 are configured to be connected to wire portions of said set of wire portions via conducting cables 20 so as to facilitate measuring electrical properties of thus connected wire portions by providing a conductive circuit.

According to an aspect of the present disclosure, different measuring connectors 10 of said measuring connectors 10 are configured to be connected to different connection points of wire portions of said set of wire portions via conducting cables 20. Said conducting cables 20 may also be denoted conducting wires 20.

According to an alternative aspect of the present disclosure, said measuring connectors 10 comprises such conducting cables 20 which are configured to be connected to wire portions of said set of wire portions so as to facilitate measuring electrical properties of thus connected wire portions by providing a conductive circuit.

According to an aspect of the present disclosure, each measuring connector 10 of said set of measuring connectors 10 comprises or is operably connected to a conducting cable 20 configured to be connected to a connection point of a wire portion of said set of wire portions of said wire configuration W. Said conducting cables 20 are configured to be an integrated part of said endless track E.

According to an aspect of the present disclosure, said conducting cables 20 are configured to be arranged within said endless track E between said ground engaging outer side E3 and the opposite drive wheel engaging inner side E4 of the endless track E.

As schematically illustrated an exemplified in FIG. 3, a measuring connector 10 is connected to a connection point of the third wire portion W1 via a conducting cable 10. As schematically illustrated an exemplified in FIG. 3, another measuring connector 10 is connected to a connection point of the sixth wire portion W2 via another conducting cable 10. As schematically illustrated an exemplified in FIG. 3, yet another measuring connector 10 is connected to a connection point of the ninth wire portion W3 via yet another conducting cable 10. As schematically illustrated an exemplified in FIG. 3, yet another measuring connector 10 is connected to a connection point of the twelfth wire portion W4 via yet another conducting cable 10. As schematically illustrated an exemplified in FIG. 3, yet another measuring connector 10 is connected to a connection point of the fifteenth wire portion W5 via yet another conducting cable 10.

As mentioned, said set of measuring connectors are configured to be externally accessible by means of one or more sensor devices 30 in connection to at least one side E1, E2 of said endless track, so as to facilitate determining damage to said endless track based on determined electrical properties of wire portions.

Said at least one sensor device 30 may be any suitable sensor device 30 for facilitating measuring electrical properties of wire portions of said wire configuration when providing connection to measuring connectors 10. According to an aspect of the present disclosures, said at least one sensor 30 device may comprise one or more potentiometers. According to an aspect of the present disclosures, said at least one sensor 30 device may comprise one or more cable finders. Said at least one sensor device 30 may comprise any suitable sensor device/arrangement for sensor device for generating power so as to facilitate determining electrical properties when providing connection to measuring connectors.

As schematically illustrated an exemplified in FIG. 3, a sensor device 30 is connected, via a first contact member 32, to a measuring connector 10 connected to a connection point of the third wire portion W1 via a conducting cable 10, and, via a second contact member 34, to a measuring connector 10 connected to a connection point of the sixth wire portion W2 via a conducting cable 10. Hereby a conductive circuit is provided by means of said sensor device 30 between said connection point of the third wire portion W1 and the connection point of the sixth wire portion W2.

The arrangement for damage of an endless track E of a tracked vehicle comprising such accessibly arranged measuring connectors 10 facilitates determining, by means of one or more such sensor devices 30, whether there is a damage to the endless track by determining electrical properties of wire portions of the wire configuration within said endless track. Damage to an endless track may be determined if determined electrical properties differs to a certain degree from predetermined electrical properties of such wire portions. According to an aspect of the present disclosure, electrical properties of wire/wire portions of said wire configuration comprising a set of strands twisted or otherwise arranged together may change/vary due to number of strands of said set of strands being broken/torn apart.

FIG. 4 schematically illustrates a plan view of a portion of an endless track E with a sensor device 30 connected to measuring connectors according to an embodiment of the present disclosure. According to an aspect of the present disclosure, as schematically illustrated in FIG. 4, the arrangement for determining damage of an endless track E of a tracked vehicle comprises at least one sensor device 30 of said one or more sensor devices 30 described above. According to an aspect of the present disclosure, as schematically illustrated in FIG. 4, the arrangement for determining damage of an endless track E of a tracked vehicle comprises a control unit 100.

According to an aspect of the present disclosure, one or more such sensor devices 30 may be operably connectable to said control unit 100. According to an aspect of the present disclosure, one or more such sensor devices 30 may be operably connectable to said control unit 100 via one or more links L.

According to an aspect of the present disclosure, one or more such control units 100 may be arranged in connection to the vehicle body of a tracked vehicle. According to an aspect of the present disclosure, one or more such control units 100 may be arranged in connection to the respective track assembly of a tracked vehicle. According to an aspect of the present disclosure, one or more such control units 100 may comprise one or more such sensor devices 30.

According to an aspect of the present disclosure, the control unit 100 comprises at least one processor 110.

According to an aspect of the present disclosure, the control unit 100 comprises a memory arrangement 120. The memory arrangement 120 may comprise at least one memory. The control unit 100 thus comprises at least one memory.

According to an aspect of the present disclosure, the control unit 100 comprises a communication interface 130. The communication interface 130 may also be denoted communication unit.

According to an aspect of the present disclosure, the at least one processor 110 of the control unit 100 is operably connectable to said at least one sensor 30.

According to an aspect of the present disclosure, the memory arrangement 120 of the control unit 100 may be integrated with or embedded into the at least one processor 110, and/or be a separate memory hardware device. According to an aspect of the present disclosure, the memory arrangement 120 of the control unit 100 is operably connectable to the at least one processor 110. According to an aspect of the present disclosure, at least one of the at least one memory of the memory arrangement 120 may be integrated with or embedded into the at least one processor 110, and/or be a separate memory hardware device.

The memory arrangement 120 may include a RAM, a ROM, a hard disk, an optical disk, a magnetic medium, a flash memory and/or any other mechanism capable of storing instructions or data.

According to an aspect of the present disclosure, the at least one processor 110 of the control unit 100 may include any physical device having an electric circuit that performs logic operations on input data. According to an aspect of the present disclosure, the at least one processor 110 of the control unit 100 may include any physical device having an electric circuit that performs logic operations on input data. For example, the at least one processor 110 may include one or more integrated circuits, microchips, microcontrollers, microprocessors, all or part of a CPU, DSP, FPGA, or other circuits for executing instructions or performing logic operations. According to an aspect of the present disclosure, actions and method steps described herein as being performed by the control unit 100 are performed by the at least one processor 110 of the control unit 100 upon execution of one or more computer programs stored in the memory arrangement 120. According to an aspect of the present disclosure, actions and method steps described herein as being performed by the at least one processor 110 are performed by the at least one processor 110 of the control unit 100 upon execution of one or more computer programs stored in the memory arrangement 120.

According to an aspect of the present disclosure, the communication interface 130 is operably connected to said memory arrangement 120. According to an aspect of the present disclosure, the communication interface 130 may be operably connected to said the at least one processor 110.

According to an aspect of the present disclosure, said control unit 100 is configured to receive, from said at least one sensor device 30, via measuring connectors 10, measurement information associated with electrical properties of wire portions W1, W2 of said wire configuration W. According to an aspect of the present disclosure, said control unit 100 is configured to, based on the information received from said at least one sensor device 30, determine electrical properties of said wire portions W1, W2. According to an aspect of the present disclosure, said control unit 100 is configured to, based on the determined electrical properties, determine whether or not there is a potential damage to the endless track E.

According to an aspect of the present disclosure, said control unit 100, when determining whether or not there is a damage to the endless track E, is configured to compare the determined electrical properties of said wire portions W1, W2 with predetermined electrical properties of wire portions of said wire configuration. According to an aspect of the present disclosure, said control unit 100 is configured to determine a damage to the endless track E if the difference between said determined electrical properties of one or more wire portions W1, W2 and said predetermined electrical properties of wire portions of said wire configuration W exceeds a predetermined threshold.

According to an aspect of the present disclosure, said control unit 100, when determining whether or not there is a potential damage to the endless track E, is further configured to determine whether one or more wire portions W1, W2 are torn apart based on said determined electrical properties.

According to an aspect of the present disclosure, said control unit 100 is further configured to determine, if it is determined that there is potential damage to the endless track E, the degree of potential damage based on number of wire portions having electrical properties exceeding said predetermined threshold.

As schematically illustrated an exemplified in FIG. 4, a sensor device 30 of said one or more sensor devices 30 is connected, via a first contact member 32, to a measuring connector 10 connected to a first connection point P1 of a wire portion W1 of a wire via a conducting cable 20, and, via a second contact member 34, to a measuring connector 10 connected to a second connection point P2 of a wire portion W2 of the wire via another conducting cable 20. Hereby a conductive circuit is provided by means of said sensor device 30 between said first connection point P1 of the wire portion W1 and the second connection point P2 of the wire portion W2.

Figure 5:
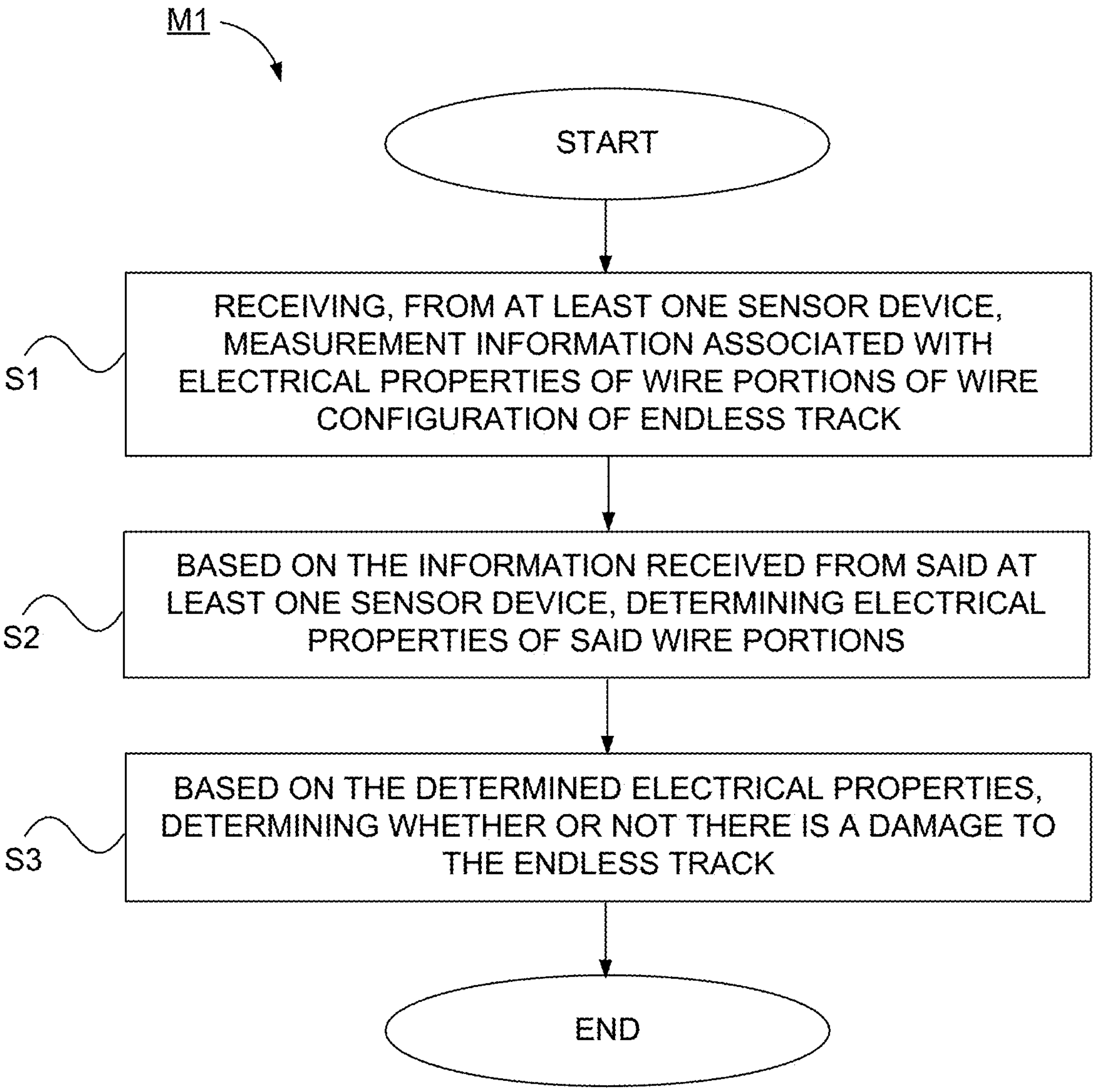
FIG. 5 schematically illustrates a flowchart of a method for determining damage of an endless track of a tracked vehicle according to an embodiment of the present disclosure.

The tracked vehicle V is, according to an embodiment, arranged to be operated in accordance with a method M1 for determining damage of an endless track of a tracked vehicle according to FIG. 5.

Figure 6:
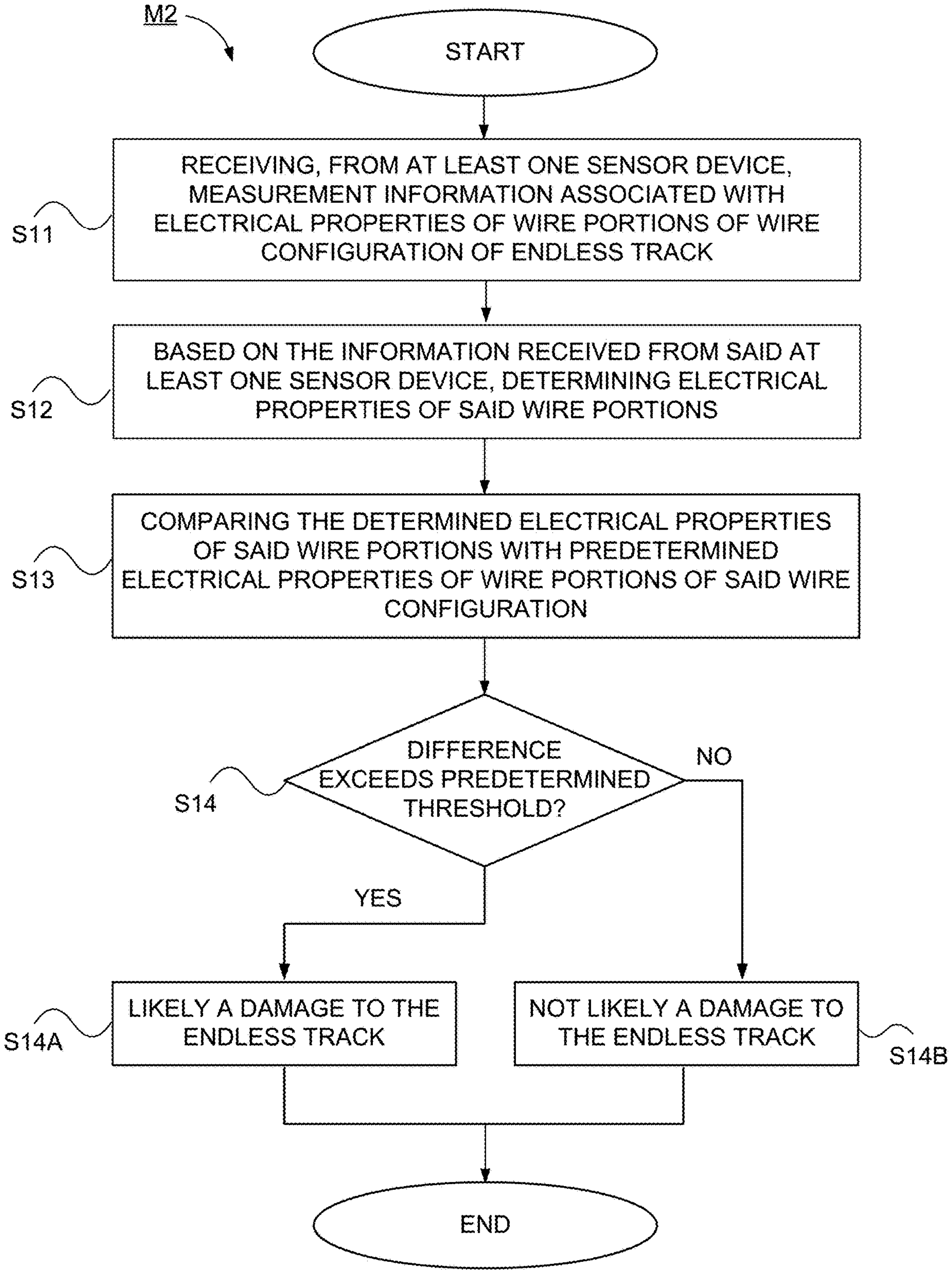
FIG. 6 schematically illustrates a flowchart of a method for determining damage of an endless track of a tracked vehicle according to an embodiment of the present disclosure.

The tracked vehicle V is, according to an embodiment, arranged to be operated in accordance with a method M2 for determining damage of an endless track of a tracked vehicle according to FIG. 6.

FIG. 5 schematically illustrates a flow chart of a method M1 for determining damage of an endless track of a tracked vehicle according to an aspect of the present disclosure.

Said tracked vehicle comprises at least one track assembly comprising said endless track disposed in its longitudinal extension around a set of wheels, wherein said endless track comprises a wire configuration arranged within said endless track and configured to run in the longitudinal extension of said endless track around said endless track. Said wire configuration comprises one or more individual wires arranged to run within said endless track so that a set of wire portions are running in said longitudinal extension. According to an aspect of the present disclosure, said one or more individual wires are arranged to run within said endless track so that said set of wire portions running in said longitudinal extension are arranged adjacent to each other within said endless track. A set of measuring connectors are connected to wire portions of said set of wire portions so as to facilitate measuring electrical properties of the thus connected wire portions. Said set of measuring connectors are accessible, according to an aspect externally accessible, by means of one or more sensor devices in connection to at least one side of said endless track. The tracked vehicle may be any suitable tracked vehicle. The tracked vehicle may be a tracked vehicle according to FIG. 1. The tracked vehicle may comprise a track assembly according to FIGS. 1-2.

According to the aspect the method M1 comprises a step S1. In this step, measurement information associated with electrical properties of wire portions of said wire configuration is received from at least one sensor device, via measuring connectors.

According to the aspect the method M1 comprises a step S2. In this step, electrical properties of said wire portions are determined based on the information received from said at least one sensor device.

According to the aspect the method M1 comprises a step S3. In this step, it is determined, based on the determined electrical properties, whether or not there is a damage to the endless track.

According to an aspect of the present disclosure, the method M1 may, if a damage to the endless track is determined, comprise a step, not shown, in which action is taken based on said determined potential damage to the endless track. Such an action may be any suitable action. Such an action may be informing an operator of the tracked vehicle and/or a control centre or the like, of the thus determined potential damage to the endless track. According to an aspect of the present disclosure, the method M1 may, if a damage to the endless track is determined to be not likely, comprise a step, not shown, in which action is taken based on said determined unlikely serious damage to the endless track. Such an action may be any suitable action. Such an action may be informing an operator of the tracked vehicle and/or a control centre or the like, of that said tracked vehicle is operable.

The method M1 for determining potential damage of an endless track of a tracked vehicle is according to an embodiment adapted to be performed by the arrangement described above with reference to FIGS. 3 and 4.

The method M1 may be performed in any suitable way. According to an aspect of the present disclosure, the method M1 may be performed by means of a control unit, e.g. a control unit 100 according to FIG. 4. Such a control unit may be configured for controlling driving operation/status of endless track for facilitating driving operation of a tracked vehicle. Such a control unit may comprise at least one processor, e.g. a processor according to FIG. 4, wherein said method according to an embodiment is adapted to be performed by such an at least one processor.

The method M1 for determining damage of an endless track of a tracked vehicle is according to an embodiment adapted to be performed by a computer program comprising computer-readable instructions which, when executed by at least one processor of a control unit of an arrangement, e.g. an arrangement according to FIG. 3 or 4, for determining potential damage of an endless track of a tracked vehicle, causes the at least one processor to perform said method M1.

FIG. 6 schematically illustrates a flow chart of a method M2 for determining damage of an endless track of a tracked vehicle according to an aspect of the present disclosure.

Said tracked vehicle comprises at least one track assembly comprising said endless track disposed in its longitudinal extension around a set of wheels, wherein said endless track comprises a wire configuration arranged within said endless track and configured to run in the longitudinal extension of said endless track around said endless track. Said wire configuration comprises one or more individual wires arranged to run within said endless track so that a set of wire portions are running in said longitudinal extension. According to an aspect of the present disclosure, said one or more individual wires are arranged to run within said endless track so that said set of wire portions running in said longitudinal extension are arranged adjacent to each other within said endless track. A set of measuring connectors are connected to wire portions of said set of wire portions so as to facilitate measuring electrical properties of the thus connected wire portions. Said set of measuring connectors are accessible, according to an aspect externally accessible, by means of one or more sensor devices in connection to at least one side of said endless track. The tracked vehicle may be any suitable tracked vehicle. The tracked vehicle may be a tracked vehicle according to FIG. 1. The tracked vehicle may comprise a track assembly according to FIGS. 1-2.

According to the aspect the method M2 comprises a step S11. In this step, measurement information associated with electrical properties of wire portions of said wire configuration is received from at least one sensor device, via measuring connectors.

According to the aspect the method M2 comprises a step S12. In this step, electrical properties of said wire portions are determined based on the information received from said at least one sensor device.

According to the aspect the method M2 comprises a step S13. In this step, the determined electrical properties of said wire portions are compared with predetermined electrical properties of wire portions of said wire configuration.

According to the aspect the method M2 comprises a step S14. In this step, it is determined, based on said comparison, whether there is a difference, and if so, if said difference if the difference between said determined electrical properties of one or more wire portions and said predetermined electrical properties of wire portions of said wire configuration exceeds a predetermined threshold.

According to the aspect the method M2 comprises a step S14A. In this step, if said difference exceeds said predetermined threshold, a damage to the endless track is determined.

According to an aspect of the present disclosure, the method M2 may, if a damage to the endless track is determined, comprise a step, not shown, in which action is taken based on said determined damage to the endless track. Such an action may be any suitable action. Such an action may be informing an operator of the tracked vehicle and/or a control centre or the like, of the thus determined potential damage to the endless track.

According to the aspect the method M2 comprises a step S14B. In this step, if said difference does not exceed said predetermined threshold, it is determined that a damage to the endless track is not likely.

According to an aspect of the present disclosure, the method M2 may, if a damage to the endless track is determined to be not likely, comprise a step, not shown, in which action is taken based on said determined unlikely potential of damage to the endless track. Such an action may be any suitable action. Such an action may be informing an operator of the tracked vehicle and/or a control centre or the like, of that said tracked vehicle is operable.

The method M2 for determining potential damage of an endless track of a tracked vehicle is according to an embodiment adapted to be performed by the arrangement described above with reference to FIGS. 3 and 4.

The method M2 may be performed in any suitable way. According to an aspect of the present disclosure, the method M2 may be performed by means of a control unit, e.g. a control unit 100 according to FIG. 4. Such a control unit may be configured for controlling driving operation/status of endless track for facilitating driving operation of a tracked vehicle. Such a control unit may comprise at least one processor, e.g. a processor according to FIG. 4, wherein said method according to an embodiment is adapted to be performed by such an at least one processor.

The method M2 for determining damage of an endless track of a tracked vehicle is according to an embodiment adapted to be performed by a computer program comprising computer-readable instructions which, when executed by at least one processor of a control unit of an arrangement, e.g. an arrangement according to FIG. 3 or 4, for determining potential damage of an endless track of a tracked vehicle, causes the at least one processor to perform said method M2.

For the above mentioned methods M1, M2, the measurement information associated with electrical properties of wire portions of said wire configuration received from at least one sensor device, may, according to aspects of the present disclosure, be obtained in any suitable way by means of any suitable sensor device/sensors devices. Below, some aspects and/or embodiments of the present disclosure with regard to said measurement information associated with electrical properties of wire portions of said wire configuration received from at least one sensor device, applicable to said methods M1, M2, are disclosed.

For the above mentioned methods M1, M2, determining whether or not there is a damage to the endless track comprises determining whether one or more wire portions are torn apart based on said determined electrical properties.

According to an aspect of the method M1 and/or M2, the method further comprises determining, if it is determined that there is damage to the endless track, the degree of damage based on number of wire portions having electrical properties exceeding said predetermined threshold.

According to an aspect of the method M1 and/or M2, the step of receiving, from at least one sensor device, measurement information associated with electrical properties of wire portions of said wire configuration (W), comprises receiving measurement information from measurement between a first connection point and a second connection point of a wire portion.

According to an aspect of the method M1 and/or M2, the step of receiving, from at least one sensor device, measurement information associated with electrical properties of wire portions of said wire configuration, comprises receiving measurement information associated with one or more of: electrical current: electrical resistance, electrical voltage, magnetic properties.

According to a second aspect of the present disclosure, the method M1, M2 may be a computer-implemented method performed by one or more processors of a control unit upon execution of a computer program. According to a second aspect of the present disclosure, the computer program may be a distributed computer program comprising program components residing in the control unit 100.

According to a second aspect of the present disclosure, the above-described method M1, M2 may be a computer-implemented method that may be performed upon execution of a computer program by one or more processors of a control unit for determining damage of an endless track of a tracked vehicle.

Thus, according to a second aspect of the present disclosure there is provided a computer program comprising computer-readable instructions which, when executed by at least one processor of a control unit for determining damage of an endless track of a tracked vehicle, causes the at least one processor to perform the steps of:

- receiving, from at least one sensor device, via measuring connectors, measurement information associated with electrical properties of wire portions of said wire configuration;
- based on the information received from said at least one sensor device, determining electrical properties of said wire portions; and,
- based on the determined electrical properties, determining whether or not there is a damage to the endless track.

The computer program may further comprise instructions for causing the at least one processor of the device to perform any of, or any combination of, the method steps of the above described method M1: M2.

The computer program may comprise several computer program components or applications configured to perform different steps of the above described method. For instance, the computer program may comprise a program component or application for data analysis and data communication residing in the control device. According to an aspect, the computer program may comprise a program component or application in form of a client application for data presentation of data and interaction with a user, residing in an electronic device of the user. The client application may, for example, be realized in form of a mobile application (app) configured to be run on a mobile electronic device, such as a mobile phone or a tablet computer, or in form of a desktop application configured to be run on a laptop or desktop computer.

According to an aspect of the present disclosure there is provided a computer program product comprising at least one computer-readable medium, such as a non-volatile memory, storing the above mentioned computer program.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method for determining damage of an endless track of a tracked vehicle, said tracked vehicle comprising at least one track assembly comprising said endless track disposed in its longitudinal extension around a set of wheels, said endless track having opposite sides configured to face in a direction essentially parallel to the axial direction of said set of wheels, wherein said endless track comprises a wire configuration arranged within said endless track and configured to run in the longitudinal extension of said endless track, said wire configuration comprising one or more individual wires arranged to run in said longitudinal extension within said endless track and configured to be distributed along the width of said endless track so that a set of wire portions are running in said longitudinal extension, wherein a set of measuring connectors are connected, via conducting cables, to wire portions of said set of wire portions so as to facilitate measuring electrical properties of the thus connected wire portions, said set of measuring connectors being permanently connected and externally accessible by one or more sensor devices in connection to at least one side of said sides of said endless track, the method comprising the steps of:

- receiving, from at least one sensor device, via measuring connectors, measurement information associated with electrical properties of wire portions of said wire configuration;
- based on the information received from said at least one sensor device, determining electrical properties of said wire portions; and,
- based on the determined electrical properties, determining whether or not there is a damage to the endless track.

2. The method of claim 1, wherein the step of determining whether or not there is a damage to the endless track comprises the steps of:

- comparing the determined electrical properties of said wire portions with predetermined electrical properties of wire portions of said wire configuration; and,
- determining a damage to the endless track if the difference between said determined electrical properties of one or more wire portions and said predetermined electrical properties of wire portions of said wire configuration exceeds a predetermined threshold.

3. The method of claim 1, wherein the step of determining whether or not there is a damage to the endless track comprises determining whether one or more wire portions are torn apart based on said determined electrical properties.

4. The method of claim 1, further comprising determining, if it is determined that there is damage to the endless track, the degree of damage based on number of wire portions having electrical properties exceeding said predetermined threshold.

5. The method of claim 1, wherein the step of receiving, from at least one sensor device, measurement information associated with electrical properties of wire portions of said wire configuration, comprises receiving measurement information from measurement between a first connection point and a second connection point of a wire portion.

6. The method of claim 1, wherein the step of receiving, from at least one sensor device, measurement information associated with electrical properties of wire portions of said wire configuration, comprises receiving measurement information associated with one or more of: electrical current; electrical resistance, electrical voltage, magnetic properties.

7. The method of claim 1, wherein said measuring connectors are configured to be an integrated part of said endless track, said measuring connecters being assembled in connection to at least one of the sides of said endless track.

8. An arrangement for determining damage of an endless track of a tracked vehicle, said tracked vehicle comprising at least one track assembly comprising said endless track disposed in its longitudinal extension around a set of wheels, said endless track having opposite sides configured to face in a direction essentially parallel to the axial direction of said set of wheels, wherein said endless track comprises a wire configuration arranged within said endless track and configured to run in the longitudinal extension of said endless track, said wire configuration comprising one or more individual wires arranged to run in said longitudinal extension within said endless track and configured to be distributed along the width of said endless track so that a set of wire portions are running in said longitudinal extension, wherein said arrangement comprises a set of measuring connectors connected, via conducting cables, to wire portions of said set of wire portions so as to facilitate measuring electrical properties of the thus connected wire portions, said set of measuring connectors being permanently connected and externally accessible by one or more sensor devices in connection to at least one side of said sides of said endless track, so as to facilitate determining damage to said endless track based on determined electrical properties of wire portions.

9. The arrangement of claim 8, wherein said arrangement comprises at least one sensor device of said one or more sensor devices, and a control unit, wherein said control unit is configured to:

receive, from said at least one sensor device, via measuring connectors, measurement information associated with electrical properties of wire portions of said wire configuration;

based on the information received from said at least one sensor device, determine electrical properties of said wire portions; and, based on the determined electrical properties, determine whether or not there is a potential damage to the endless track.

10. The arrangement of claim 9, wherein said control unit, when determining whether or not there is a damage to the endless track, is configured to:

compare the determined electrical properties of said wire portions with predetermined electrical properties of wire portions of said wire configuration; and, determine a potential damage to the endless track if the difference between said determined electrical properties of one or more wire portions and said predetermined electrical properties of wire portions of said wire configuration exceeds a predetermined threshold.

11. The arrangement of claim 9, when determining whether or not there is a potential damage to the endless track, further being configured to determine whether one or more wire portions are torn apart based on said determined electrical properties.

12. The arrangement of claim 9, the control unit further being configured to determine, if it is determined that there is potential damage to the endless track, the degree of potential damage based on number of wire portions having electrical properties exceeding said predetermined threshold.

13. The arrangement of claim 8, wherein said arrangement comprises at least one sensor device of said one or more sensor devices, wherein a sensor device of said at least one sensor device, is configured to be connected to a first measuring connector connected to a first connection point of a wire portion and a second measuring connector connected to a second connection point of a wire portion, so as to receive measurement information associated with electrical properties from measurement between said first connection point and second connection point of said wire portion.

14. The arrangement of claim 8, wherein said determined electrical properties of wire portions of said wire configuration via measuring connectors, comprises one or more of: electrical current; electrical resistance, electrical voltage, magnetic properties.

15. The arrangement of claim 8, wherein said measuring connectors are configured to be an integrated part of said endless track, said measuring connecters being assembled in connection to at least one of the sides of said endless track.

16. A tracked vehicle comprising an arrangement of claim 8.

17. A non-transitory computer-readable storage medium comprising computer-readable instructions which, when executed by at least one processor of a control unit for determining damage of an endless track of a tracked vehicle, causes the at least one processor to perform the steps of claim 1.

* * * * *